(12) United States Patent
You et al.

(10) Patent No.: US 10,959,213 B2
(45) Date of Patent: Mar. 23, 2021

(54) METHOD AND DEVICE FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 111 days.

(21) Appl. No.: 16/324,529

(22) PCT Filed: Aug. 10, 2017

(86) PCT No.: PCT/KR2017/008686
§ 371 (c)(1),
(2) Date: Feb. 8, 2019

(87) PCT Pub. No.: WO2018/030813
PCT Pub. Date: Feb. 15, 2018

(65) Prior Publication Data
US 2019/0182821 A1    Jun. 13, 2019

Related U.S. Application Data

(60) Provisional application No. 62/372,815, filed on Aug. 10, 2016.

(51) Int. Cl.
*H04W 4/00* (2018.01)
*H04W 72/04* (2009.01)
(Continued)

(52) U.S. Cl.
CPC ...... *H04W 72/0406* (2013.01); *H04B 7/0408* (2013.01); *H04B 7/06* (2013.01);
(Continued)

(58) Field of Classification Search
CPC ............. H04W 72/0406; H04W 16/28; H04W 72/042; H04W 72/046; H04B 7/0408;
(Continued)

(56) References Cited

U.S. PATENT DOCUMENTS

2005/0037799 A1* 2/2005 Braun .................. H04W 16/28
455/525
2013/0235742 A1* 9/2013 Josiam ................ H04B 7/0695
370/252
(Continued)

FOREIGN PATENT DOCUMENTS

WO    2015095564        6/2015
WO    WO-2015095564 A1 * 6/2015 ............ H04W 16/18

OTHER PUBLICATIONS

Klaus (A Flexible 5G Frame Structure Design for Frequency-Division Duplex Cases, Mar. 2016, IEEE). (Year: 2016).*
(Continued)

*Primary Examiner* — Maharishi V Khirodhar
(74) *Attorney, Agent, or Firm* — Lee, Hong, Degerman, Kang & Waimey

(57) ABSTRACT

The present invention relates to a wireless communication system and, more particularly, to a method and a device for the method. The method comprises the steps of: receiving same control channels in a plurality of differing analog beam directions; transmitting feedback information about one analog beam direction selected from the plurality of differing analog beam directions in which the control channels have been received; and receiving data channels, which correspond to the control channels, in only one analog beam direction, which is related to the feedback information, among the plurality of differing analog beam directions.

12 Claims, 14 Drawing Sheets

OFDM symbol with 15kHz subcarrier spacing       OFDM symbol with 30kHz subcarrier spacing

URLLC PDCCH     URLLC PDSCH     URLLC PUCCH A     URLLC PUCCH B

(51) Int. Cl.
*H04B 7/0408* (2017.01)
*H04B 7/06* (2006.01)
*H04L 5/00* (2006.01)
*H04W 16/28* (2009.01)

(52) U.S. Cl.
CPC .............. *H04L 5/00* (2013.01); *H04L 5/0053* (2013.01); *H04L 5/0055* (2013.01); *H04W 16/28* (2013.01); *H04W 72/042* (2013.01); *H04L 5/0023* (2013.01); *H04L 5/0048* (2013.01); *H04W 72/046* (2013.01)

(58) Field of Classification Search
CPC ........... H04B 7/06; H04B 7/0695; H04L 5/00; H04L 5/0055; H04L 5/0053; H04L 5/0048; H04L 5/0023
See application file for complete search history.

(56) References Cited

U.S. PATENT DOCUMENTS

2013/0286960 A1* 10/2013 Li ..................... H04B 7/0684
370/329
2015/0009968 A1    1/2015 Yu et al.
2018/0310283 A1* 10/2018 Deenoo ............... H04W 72/046

OTHER PUBLICATIONS

PCT International Application No. PCT/KR2017/008686, Written Opinion of the International Searching Authority dated Nov. 24, 2017, 22 pages.

Schaich, F. et al., "Preliminary results for multi-service support in link solution adaptation", Deliverable D3.1, Fantastic-5G, Jun. 2016, 213 pages.

* cited by examiner

FIG. 13
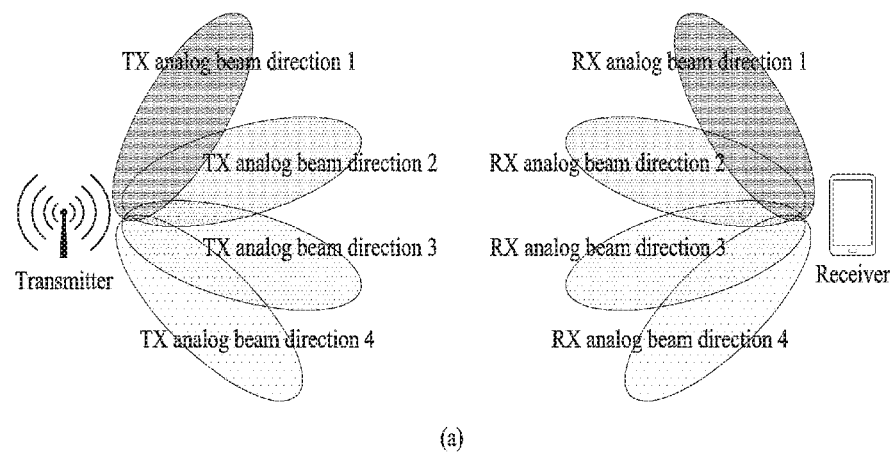
(a)
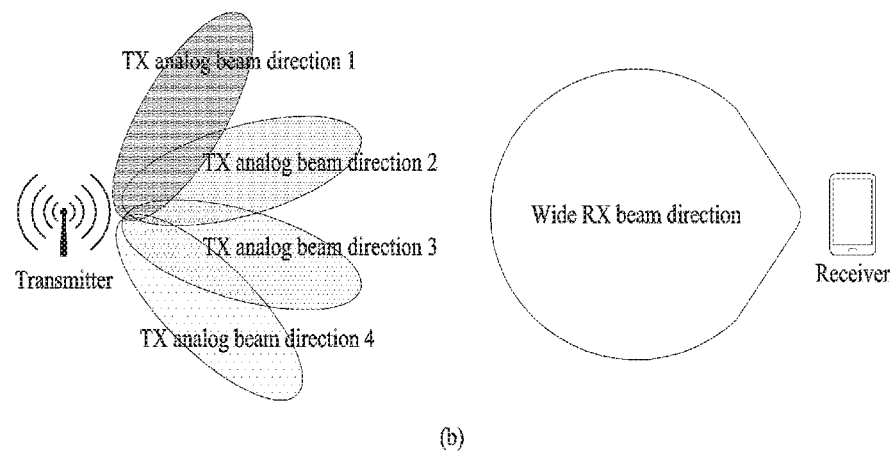
(b)

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2017/008686, filed on Aug. 10, 2017, which claims the benefit of U.S. Provisional Application No. 62/372,815, filed on Aug. 10, 2016, the contents of which are all hereby incorporated by reference herein in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present disclosure is to provide a method of efficiently transmitting/receiving a wireless signal, and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving a signal by a user equipment (UE) in a wireless communication system comprises receiving a same control channel in a plurality of different analog beam directions, transmitting feedback information about one analog beam direction selected from among the plurality of different analog beam directions in which the control channel has been received, and receiving a data channel corresponding to the control channel only in one analog beam direction related to the feedback information among the plurality of different analog beam directions.

In another aspect of the present disclosure, a UE in a wireless communication system comprises a radio frequency (RF) module, and a processor. The processor is configured to receive a same control channel in a plurality of different analog beam directions, to transmit feedback information about one analog beam direction selected from among the plurality of different analog beam directions in which the control channel has been received, and to receive a data channel corresponding to the control channel only in one analog beam direction related to the feedback information among the plurality of different analog beam directions.

Preferably, the feedback information may be transmitted in control channel resources determined based on the selected analog beam direction, and the control channel resources may comprise a different time resource for each analog beam direction.

Preferably, a signal of the control channel may have a first subcarrier spacing (SC), a signal of the data channel may have a second SC, and the second SC may be smaller than the first SC. In this case, the second SC may be a multiple of the first SC.

Preferably, a signal of the control channel and a signal of the data channel may have the same SC, the control channel may be received only once in each of the plurality of different analog beam directions, and the data channel may be received repeatedly a plurality of times in the same analog beam direction.

Preferably, each analog beam direction of the plurality of different analog beam directions may correspond to a different orthogonal frequency division multiplexing (OFDM) symbol.

Preferably, the control channel may comprise a physical downlink control channel (PDCCH), and the data channel may comprise a physical downlink shared channel (PDSCH).

Advantageous Effects

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

FIGS. 12 to 14 illustrate signal transmission according to the present disclosure.

MODE FOR CARRYING OUT THE INVENTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
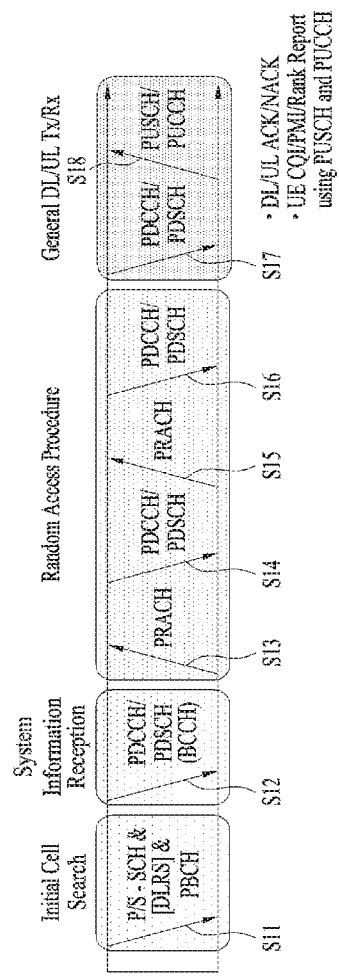
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
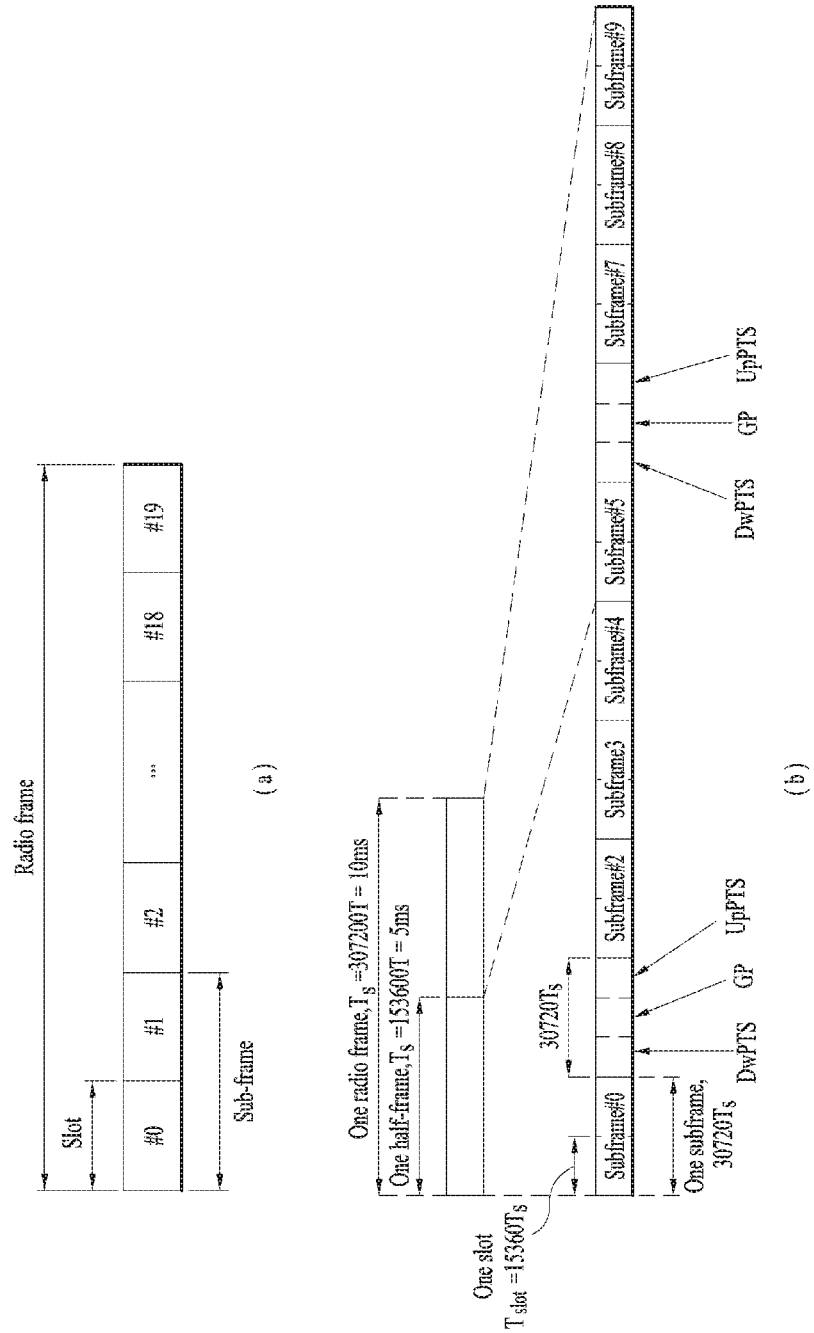
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(*b*) illustrates a type-2 radio frame structure. The type-2 radio frame includes 2 half frames. Each half frame includes 4(5) normal subframes and 10 special subframes.

The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configu-ration | Downlink-to-Uplink Switch point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
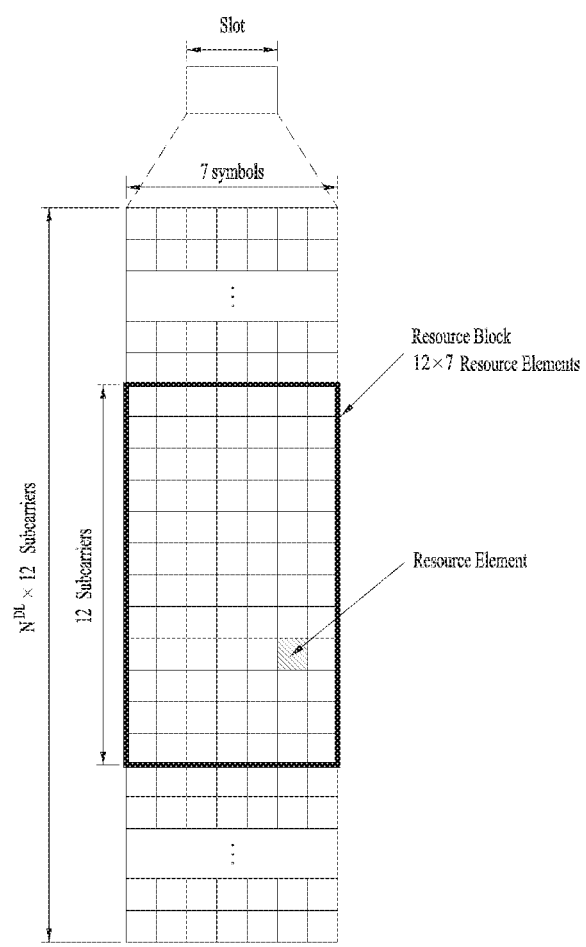
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
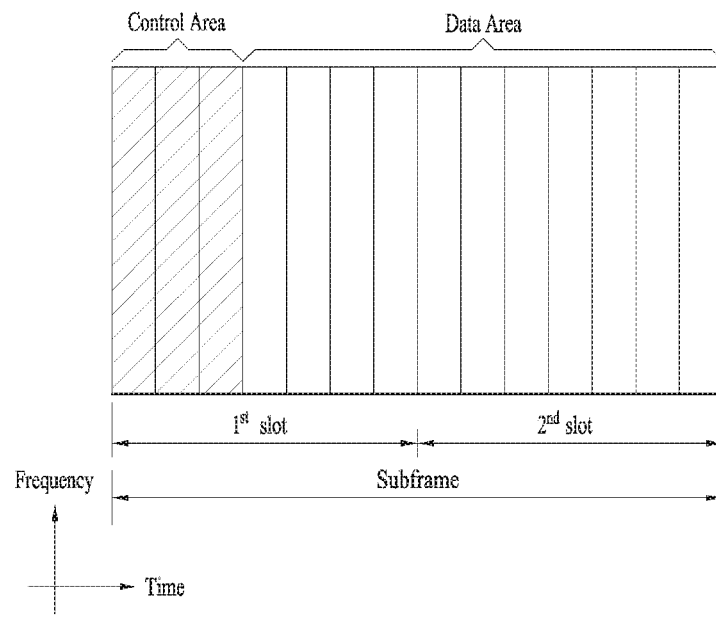
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e., group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
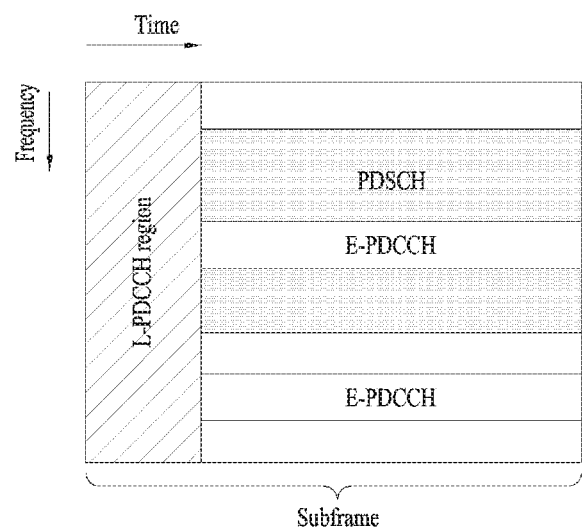
FIG. 5 illustrates an example of an Enhanced Physical Downlink Control Channel (EPDCCH).

Transmission mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (port5) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission
DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
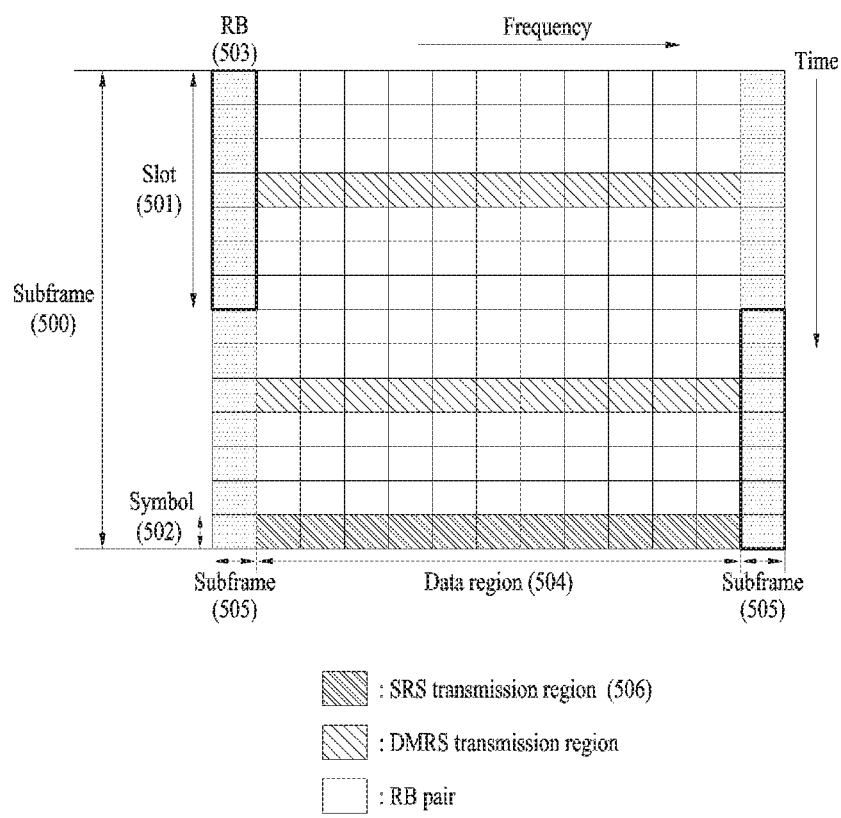
FIG. 6 illustrates the structure of an uplink subframe used in LTE(-A).

FIG. 6 illustrates a structure of an uplink subframe used in LTE(-A).

Referring to FIG. 6, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 7:
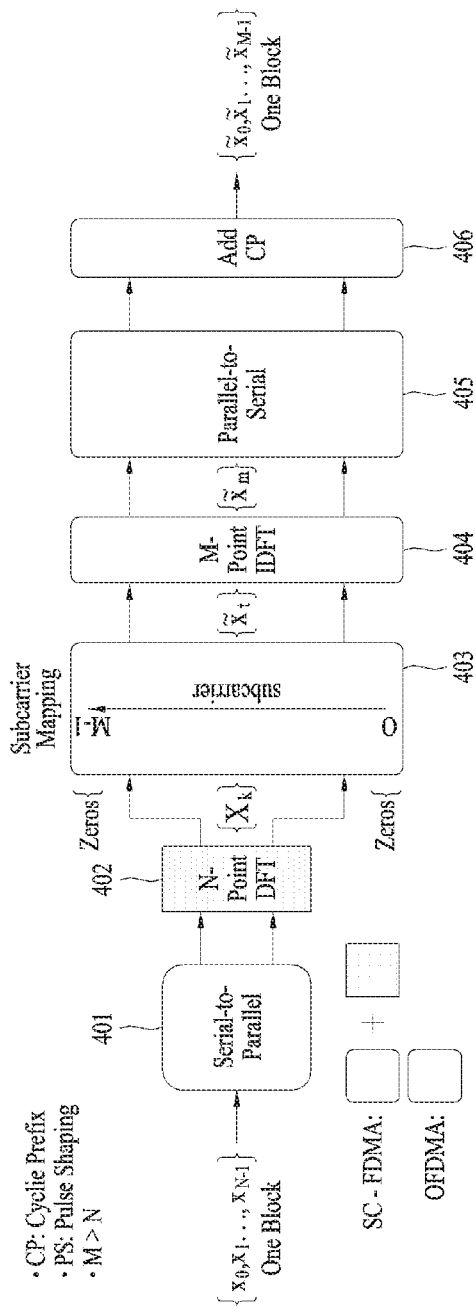
FIG. 7 illustrates Single Carrier Frequency Division Multiple Access (SC-FDMA) scheme and Orthogonal Frequency Division Multiple Access (OFDMA) scheme.

FIG. 7 illustrates SC-FDMA and OFDMA schemes. The 3GPP system employs OFDMA in downlink and uses SC-FDMA in uplink.

Referring to FIG. 7, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

Next, HARQ (Hybrid Automatic Repeat reQuest) will be described. When there are a plurality of UEs having data to be transmitted on uplink/downlink in a wireless communication, an eNB selects UEs which will transmit data per transmission time internal (TTI) (e.g., subframe). In a system using multiple carriers and the like, an eNB selects UEs which will transmit data on uplink/downlink per TTI and also selects a frequency band to be used for data transmission of the corresponding UEs.

When description is based on uplink (UL), UEs transmit reference signals (or pilot signals) on uplink and an eNB detects channel states of the UEs using the reference signals transmitted from the UEs and selects UEs which will transmit data on uplink in each unit frequency band per TTI. The eNB notifies the UEs of the result of selection. That is, the eNB transmits, to UL scheduled UEs, a UL assignment message indicating that the UEs may transmit data using a specific frequency band in a specific TTI. The UL assignment message is also referred to as a UL grant. The UEs transmit data on uplink according to the UL assignment message. The UL assignment message may include UE identity (ID), RB allocation information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may include UE ID, RB allocation information, HARQ process ID/number, RV and NDI information because frequency resources or an MCS for retransmission vary with transmission time.

Figure 8:
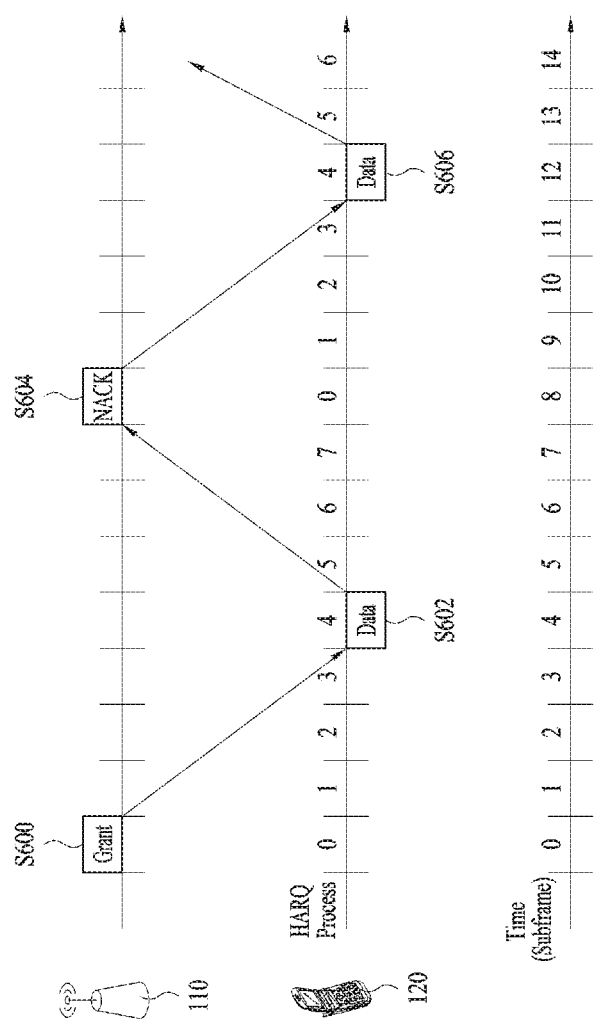
FIG. 8 illustrates UL HARQ (Uplink Hybrid Automatic Repeat Request) operation.

FIG. 8 illustrates a UL HARQ operation in an LTE(-A) system. In the LTE(-A) system, asynchronous adaptive HARQ is used as UL HARQ. When 8-channel HARQ is used, 0 to 7 are provided as HARQ process numbers. One HARQ process operates per TTI (e.g., subframe). Referring to FIG. 8, a UL grant is transmitted to a UE 120 through a PDCCH (S600). The UE 120 transmits UL data to an eNB 110 after 4 subframes from the time (e.g., subframe 0) at which the UL grant is received using an RB and an MCS designated by the UL grant (S602). The eNB 110 decodes the UL data received from the UE 120 and then generates ACK/NACK. When decoding of the UL data fails, the eNB 110 transmits NACK to the UE 120 (S604). The UE 120 retransmits the UL data after 4 subframes from the time at which NACK is received (S606). Initial transmission and retransmission of the UL data are performed through the same HARQ process (e.g., HARQ process 4). ACK/NACK information may be transmitted through a PHICH.

In the LTE(-A) system, the DL HARQ scheme uses asynchronous adaptive HARQ. Specifically, the base station 110 transmits a DL grant to the UE 120 on the PDCCH. The UE 120 receives DL data from the base station 110 using an RB and an MCS designated by the DL grant at the time (e.g., subframe 0) at which the DL grant is received. The UE 120 decodes the DL data and then generates an ACK/NACK. When decoding of the DL data fails, the UE 120 transmits a NACK to the base station 110 at a time (e.g., subframe 4) 4 subframes after the time when the UE 120 receives the DL data. Thereafter, the base station 110 transmits, to the UE 120, a DL grant for instructing retransmission of the DL data on the PDCCH at a desired time (e.g., subframe X). The UE 120 re-receives the DL data from the base station 110 using an RB and MCS designated by the DL grant at the time (e.g., subframe X) when the DL grant is received.

Figure 9:
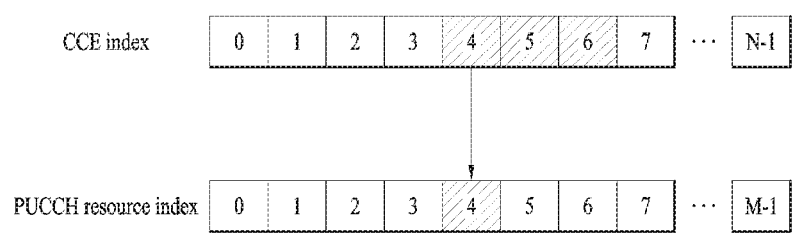
FIG. 9 illustrates an example of determining a PUCCH resource for ACK/NACK.

FIG. 9 illustrates an example of determining a PUCCH resource for ACK/NACK. In LTE system, a PUCCH resource for ACK/NACK is not allocated to each of UEs in advance. A plurality of UEs belonging to a cell use multiple PUCCH resources in a manner of sharing the resources at every timing. Specifically, when a UE uses a PUCCH resource to transmit ACK/NACK, the PUCCH resource corresponds to a PDCCH on which scheduling information on downlink data is carried. In each downlink subframe, a region in which PDCCH is transmitted is configured by a plurality of CCEs (control channel elements) and a PDCCH transmitted to a UE is configured by one or more CCEs. Having received the CCEs constructing the PDCCH, the UE transmits ACK/NACK via a PUCCH resource corresponding to a specific CCE (e.g., first CCE) among the CCEs.

As more and more communication devices require larger communication capacities, there is a need for enhanced mobile communication, compared to the legacy radio access technology (RAT). In addition, massive machine type communications (MTC) that provides various services at any time in any place by connecting multiple devices and objects to each other is one of important issues to be addressed for future-generation communications. Communication system designs are under discussion, in which services/UEs sensitive to reliability and latency are considered. As such, the introduction of future-generation RAT that considers enhanced mobile broadband communication (eMBB), massive MTC (mMTC), and ultra-reliable and low latency communication (URLLC) is discussed. For the convenience, this technology is referred to as new RAT in the present disclosure.

While the following description is given of proposed methods in the context of a new RAT system, for the convenience, the proposed methods may also be extended to other systems than the new RAT system, such as the 3GPP LTE/LTE-A system.

The new RAT system may adopt 01-DM or a similar transmission scheme, and generally use an OFDM numerology as specified in Table 4. Further, the new RAT system may still use a legacy LTE/LTE-A numerology, or have a larger system band (e.g., 100 MHz). Further, one cell may support a plurality of numerologies. That is, UEs operating with different numerologies may co-exist within one cell.

TABLE 4

| Parameter | Value |
| --- | --- |
| Subcarrier-spacing (Δf) | 75 kHz |
| OFDM symbol length | 13.33 us |
| Cyclic Prefix(CP) length | 1.04 us/0/94 us |
| System BW | 100 MHz |
| No. of available subcarriers | 1200 |
| subframe length | 0.2 ms |
| Number of OFDM symbol per subframe | 14 symbols |

Figure 10:
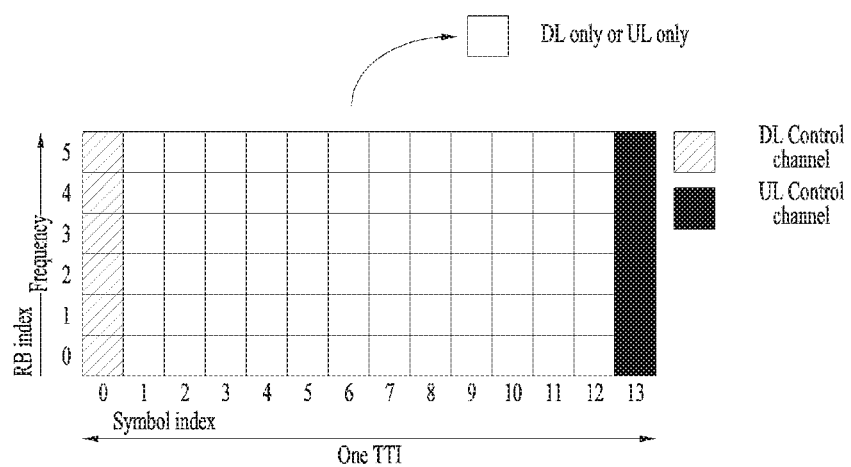
FIG. 10 illustrates a structure of a self-contained subframe.

In the new RAT (Radio Access Technology) system, a self-contained subframe is considered in order to minimize data transmission latency. FIG. 10 illustrates a self-contained subframe structure. In FIG. 10, a hatched region represents a DL control region and a black region represents a UL control region. A blank region may be used for DL data transmission or UL data transmission. DL transmission and UL transmission are sequentially performed in a single subframe, and thus DL data can be transmitted and UL ACK/NACK can also be received in a subframe. Consequently, a time taken until data retransmission is performed when a data transmission error is generated is reduced and thus final data delivery latency can be minimized.

As examples of self-contained subframe types which can be configured/set, the following four subframe types can be considered. Respective periods are arranged in a time sequence.

DL control period+DL data period+GP (Guard Period)+UL control period
DL control period+DL data period
DL control period+GP+UL data period+UL control period
DL control period+GP+UL data period A PDFICH, a PHICH and a PDCCH can be transmitted in the data control period and a PDSCH can be transmitted in the DL data period. A PUCCH can be transmitted in the UL control period and a PUSCH can be transmitted in the UL data period. The GP provides a time gap in a process in which a BS and a UE switch from a transmission mode to a reception mode or in a process in which the BS and the UE switch from the reception mode to the transmission mode. Some OFDM symbols in a subframe at a time when DL switches to UL may be set to the GP.

Meanwhile, due to its short wavelength, millimeter wave (mmW) allows installation of multiple antennas in the same area. For example, since the wavelength is 1 cm in the 30 GHz band, a total of 100 antenna elements may be arranged in a two-dimensional array with a spacing of 0.5λ (wavelength). Accordingly, an mmW system seeks to extend coverage or increase throughput by increasing a beamforming (BF) gain, using multiple antenna elements.

In this regard, the use of a transceiver unit (TXRU) per antenna element to control transmission power and a phase on an antenna element basis enables independent beamforming per frequency resource. However, the installation of a TXRU for each of the 100 antenna elements is not viable in terms of cost. Therefore, a technique of mapping a plurality of antenna elements to one TXRU and controlling the direction of a beam by an analog phase shifter is under consideration. A shortcoming with this analog beamforming (BF) scheme lies in that frequency-selective beams are not formed because a beam is steered only in one direction across a total band. As a compromise between analog BF and digital BF, hybrid BF may be considered, in which B TXRUs fewer than Q antenna elements are used. In this case, the number of beam directions available for simultaneous transmission is limited to B or less although the number is different depending on the mapping relationship between B TXRUs and Q antenna elements.

Figure 11:
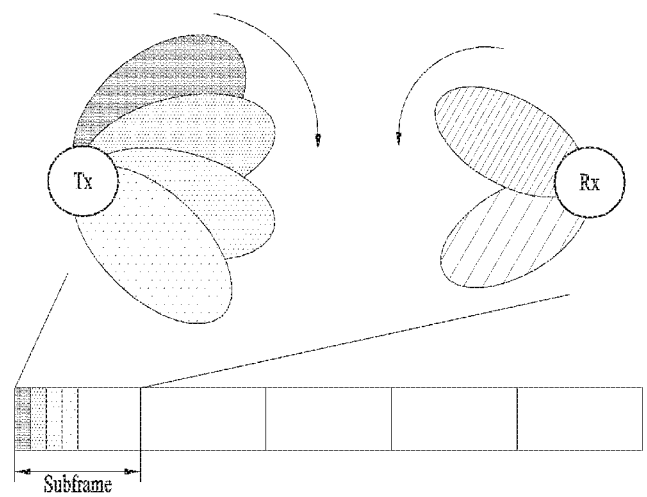
FIG. 11 illustrates analog beamforming

FIG. 11 illustrates analog beamforming. Referring to FIG. 11, a transmitter may transmit a signal while changing a direction of the beam over time (transmit beamforming). A receiver may also receive a signal while changing a direction of the beam over time (receive beamforming). Within a certain time interval, (i) directions of the transmit and receive beams may change simultaneously over time, (ii) a direction of the transmit beam may be fixed over time, while only a direction of the receive beam may change over time, or (iii) a direction of the receive beam may be fixed over time, while only a direction of the transmit beam may change over time. After acquiring DL synchronization, a UE may use a beam reference signal (BRS) to select the best beam. The BRS occupies the total system band of an eNB, thereby enabling detection of the best beam for a wideband channel. The transmission period of the BRS may vary depending on the whole coverage, the number of beams, the number of antenna prots, and so on of the eNB.

Embodiments

The present disclosure proposes a technique of transmitting a control channel and/or a data channel in a plurality of analog beam directions in order to increase transmission reliability in a new RAT environment. In the case where there is no accurate knowledge of a best analog beam direction for a UE, or an analog beam direction changes due to movement of the UE or a change in an ambient environment, the technique of transmitting a control channel and/or a data channel in a plurality of analog beam directions may be helpful in increasing reliability. Particularly, reliability is more important to a URLLC control channel and/or data channel, and thus this technique is applicable to the URLLC control and/or data channel. Unless otherwise specified, a beam refers to an analog beam, and thus the terms, beam and analog beam are interchangeably used in the following description. An analog beam involves control of a beam direction by an analog phase shifter in an analog area of a radio frequency (RF) chain, distinguished from control of a beam direction by precoding in a baseband digital area.

On DL, a transmitter may be an eNB and a receiver may be a UE, whereas on UL, a transmitter may be a UE and a receiver may be an eNB. In the present disclosure, a transmitter may transmit a control channel and/or a data channel in a plurality of analog beam directions in order to increase transmission reliability, and a receiver may receive control information and/or data on the control channel and/or the data channel. For the convenience of description, a channel carrying DL data at a physical end is referred to as a PDSCH, and a channel carrying UL data at a physical end is referred to as a PUSCH in the present disclosure. Further, a channel carrying DL control information at the physical end is referred to as a PDCCH, and a channel carrying UL control information at the physical end is referred to as a PUCCH. While the present disclosure is described mainly in the context of a DL environment (e.g., PDCCH and PDSCH transmissions) for the convenience, it is obvious that the present disclosure is also applicable to a UL environment (e.g., PUCCH and PUSCH transmissions).

Figure 12:
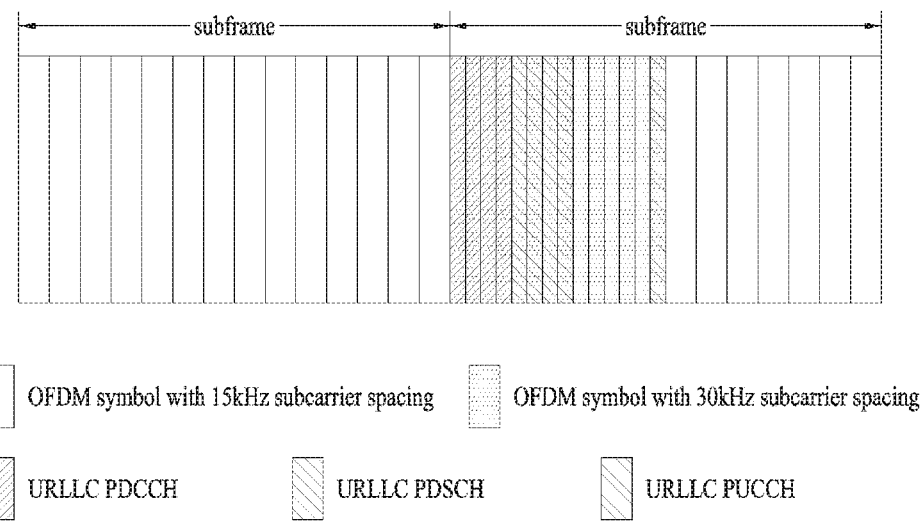

For URLLC transmission, a signal may be transmitted with a subcarrier spacing different from that of eMBB transmission. For example, as illustrated in FIG. 12, transmission channels may be transmitted with a 15-kHz subcarrier spacing in eMBB, whereas all or a part of transmission channels may be transmitted with a larger subcarrier spacing (e.g., 30 kHz) in URLLC in order to reduce latency. FIG. 12 illustrates an example of transmitting a URLLC PDCCH, a URLLC PDSCH, and a URLLC PUCCH with a 30-kHz subcarrier spacing, when URLLC data is transmitted in some time-domain resources of a specific subframe. In this case, an eMBB channel and a URLLC channel may be transmitted in time division multiplexing (TDM), with different OFDM numerologies.

While the present disclosure is described separately by section, for the convenience, the contents of sections may be used in combination. For example, a beam direction feedback method described in section A is applicable to feedback methods described in sections C, D, E, and F.

A. Transmission Method Using Multiple Beam Directions

The eNB may transmit a control channel and/or a data channel in a plurality of analog beam directions in order to increase transmission reliability. The UE may select the best of the plurality of analog beam directions, and receive a signal in the selected best analog beam direction, or may aggregate signals received in the plurality of analog beam directions.

In this case, as the transmission position of control information and/or data is pre-defined or pre-configured per analog beam direction, the UE may be aware of a transmission resource for a specific analog beam direction.

Analog Beam Direction Feedback Method of UE

When the eNB transmits a signal (e.g., PDCCH, PDSCH, or RS) in a plurality of Tx beam directions, the UE may determine the best of the Tx beam directions and feed back the best Tx beam direction to the eNB.

The eNB may receive only a signal in a specific Rx beam direction at a specific time, and the Rx beam direction in which the eNB receives a signal may be different according to each Tx beam direction. For example, if the eNB transmits a Tx signal in beam direction 1, the eNB may receive an Rx signal for the Tx signal in Rx beam direction 1. If the eNB transmits a Tx signal in beam direction 2, the eNB may receive an Rx signal for the Tx signal in Rx beam direction 2. Meanwhile, a feedback resource may have been configured according to a beam direction that the UE determines as offering a good channel condition/reception performance. For example, if the eNB has transmitted a signal in beam direction 1 and beam direction 2, and the UE has determined beam direction 1 to be better, the UE may transmit a feedback of the beam direction in an A/N resource (or feedback resource) configured for beam direction 1. The A/N resource may be distinguished by at least one of a time resource (e.g., an OFDM symbol index, a slot index, a subframe index, or the like), a frequency resource (e.g., a PRB index), or a code resource (e.g., an orthogonal cover code (OCC) or a cyclic shift (CS)). The A/N resource may be identified by an A/N resource index, and the A/N resource index may correspond to a combination of [time resource, frequency resource, code resource] for A/N transmission. Different A/N resources may be configured for different beam directions in which a control signal (e.g., PDCCH (DCI)) is transmitted (that is, different A/N resources are configured for control signals transmitted in different beams). Or, different A/N resources may be configured for different beam directions in which data (e.g., PDSCH) is transmitted. For this purpose, a plurality of A/N resources may be configured by one control signal (e.g., DCI) that schedules data transmission. That is, in the case where one control signal schedules data transmissions in a plurality of beam directions, or in the case where even though data is transmitted in one beam direction, the data transmission is possible on a plurality of beams, A/N resources for the plurality of beams may be indicated by DCI. Or, A/N resources for a plurality of beams used for data transmission may be determined from an A/N resource index indicated by DCI according to a certain rule. For example, DCI may indicate only an A/N resource index for beam direction 1, and A/N resource indexes for other beam directions may be determined by sequentially increasing the A/N resource index for beam direction 1 (e.g., adding an offset according to a beam direction).

An A/N resource (feedback resource) for a Tx beam direction may be configured as follows.

Method 1. An A/N resource (or feedback resource) may be configured for each Tx analog beam direction. For example, a transmission resource may be determined/configured per Tx analog beam direction, and an A/N resource (or feedback resource) may also be determined/configured per Tx analog beam direction. In the presence of a Tx analog beam index, an A/N resource (index) may be implicitly determined according to the Tx analog beam index. For example, it may be given that A/N resource (index)=Tx analog beam index+offset. Or an A/N resource (index) per Tx analog beam direction may be explicitly configured by a system information block (SIB)/radio resource control (RRC) signaling.

Method 2. An A/N resource (or feedback resource) may be determined/configured for each OFDM symbol position in which a control channel and/or a data channel is transmitted. For example, an A/N resource (index) may be implicitly determined according to the index of an OFDM symbol carrying a control channel and/or a data channel. For example, it may be given that A/N resource (index)=Tx OFDM symbol index+offset. Or an A/N resource (index) may be explicitly configured for the index of each OFDM symbol carrying a control channel and/or a data channel by an SIB/RRC signaling.

A corresponding method may be configured for a UE by higher-layer (e.g., RRC) signaling or dynamically by DCI.

Multi-Beam Direction Selection Method of eNB

The eNB may transmit a control channel and/or a data channel in all analog beam directions. For example, if the eNB supports four directions 1, 2, 3, and 4 as analog beam directions, the eNB may transmit a channel in all of the four directions. Meanwhile, considering that transmission of a signal even in an unnecessary analog beam direction may result in resource/energy waste, a control channel and/or a data channel may be transmitted only in a few beam directions, not all of the beam directions.

For this purpose, the eNB should be able to determine an analog beam direction suitable for the UE, and the following methods may be considered. First, the eNB may select a set of analog beam directions for transmission to the UE based on analog beam directions recently fed back by the UE. Or the UE may periodically transmit an RS (e.g., SRS) to the eNB so that the eNB may track an analog beam direction suitable for the UE.

Meanwhile, to receive a control channel and/or a data channel transmitted in a plurality of analog beam directions by the eNB, the UE should have knowledge of the number, directions, and/or transmission resource position per beam direction of analog beams carrying the control channel and/or the data channel. To this end, the following methods may be available. One or more of the following methods may be used alone or in combination.

- The number of analog beams on which the eNB transmits a control channel and/or a data channel may be fixed. For example, if the eNB supports four directions 1, 2, 3, and 4 as analog beam directions, analog beams carrying a control channel and/or a data channel may always be transmitted in two or three beam directions.
- The number, directions, and/or transmission resource position per beam direction of analog beams carrying the control channel and/or the data channel may be configured by an SIB, RRC signaling, or the like.
- The number, directions, and/or transmission resource position per beam direction of analog beams carrying the data channel may be configured dynamically by DCI.
- The UE may perform blind detection to determine the number, directions, and/or transmission resource position per beam direction of analog beams carrying the control channel and/or the data channel.
- The number, directions, and/or transmission resource position per beam direction of analog beams carrying the control channel and/or the data channel may be determined according to an operating signal to noise ratio (SNR) of the UE. Particularly, the number of analog beams on which the control channel and/or the data channel is transmitted may change according to an operating SNR range of the UE. If the operating SNR range of the UE is narrow, the control channel and/or the data channel may be transmitted in a relatively large number of analog beam directions, whereas if the operating SNR range of the UE is wide, the control channel and/or the data channel may be transmitted in a relatively small number of analog beam directions. The operating SNR range of the UE may be replaced with a latest MCS level configured for the UE.
- The eNB may determine a set of analog beam directions in which a control channel and/or a data channel is to be transmitted, based on a recent analog beam direction fed back by the UE. For example, the eNB may transmit the control channel and/or the data channel in adjacent analog beam directions including the recent analog beam direction fed back by the UE.

More characteristically, the number and directions of beams may be different for each subframe or slot. For example, the number and directions of beams may be configured differently per subset of subframes or slots.

B. Rx Beam Direction Selection Method

The UE may receive a Tx signal from the eNB in two methods, as illustrated in FIG. 13. As illustrated in FIG. 13(a), one of the methods is that the UE selects its suitable Rx analog beam direction, and receives a signal in the selected Rx analog beam direction. This method may increase the reception performance of a signal, and may be feasible when the UE has low mobility or is capable of estimating its suitable Rx analog beam direction well. As illustrated in FIG. 13(b), the other method is that the UE receives a signal in a whole beam direction, that is, a wide beam direction without selecting a specific analog beam direction. Despite low signal reception performance compared to the method of selecting a suitable Rx analog beam direction, this method may be feasible when the UE has high mobility or has difficulty in estimating its suitable Rx analog beam direction.

As illustrated in FIG. 13(a), if the UE selects its suitable Rx analog beam direction and receives a signal in the selected Rx analog beam direction, the UE may use the following method in order to select its suitable Rx analog beam direction.

- The UE may determine its best analog beam direction, using an RS such as a beam reference signal (BRS) or the like. This RS may be transmitted periodically or aperiodically to thereby enable the UE to track an Rx analog beam direction, when needed.

C. Switching Between Wide Beam and Narrow Beam

In signal transmission, although the eNB may transmit a signal on a narrow beam by analog beamforming, the eNB may transmit the signal on a wide beam without beamforming. While the use of analog beamforming extends coverage, the analog beamforming may lead to failed signal transmission, when the UE does not have accurate knowledge of a beam direction. On the contrary, although transmission of a signal on a wide beam may decrease transmission coverage, it may be useful when the position of the UE is not clear or the UE has high mobility. A different transmission scheme may be feasible according to the coverage of the UE, a channel environment, the importance of data latency, and so on, and the present disclosure proposes a transmission scheme that may selectively uses wide beam transmission and narrow beam (analog beamforming) transmission.

A control channel and/or a data channel, and a related RS may be transmitted on a wide beam or a narrow beam, and wide beam transmission or narrow beam transmission may be indicated in the following manners.

- It may be configured semi-statically by RRC signaling or the like.
- Wide beam transmission or narrow beam transmission of the control channel and/or the data channel may be indicated according to a scrambling sequence applied to a DM-RS for the control channel and/or the data channel
- A transmission scheme for the data channel may be indicated dynamically by DCI or the like.
- Wide beam transmission or narrow beam transmission of the control channel and/or the data channel may depend on a time interval between a last transmission and reception time with the UE and a next transmission and reception time with the UE. For example, if the time interval between the last transmission and reception time with the UE and the next transmission and reception time with the UE is equal to or less than a specific time period T (T>0), the eNB may transmit the control channel and/or the data channel on a narrow beam. On the contrary, if the time interval between the last transmission and reception time with the UE and the next transmission and reception time with the UE is larger than the specific time period T, the eNB may transmit the control channel and/or the data channel on a wide beam. The last transmission and reception time with the UE may be 1) a last time when a PDCCH has been transmitted to the UE, 2) a last time when a PDSCH/PUSCH has been transmitted/received to/from the UE, 3) a last time when a PUCCH has been received from the UE, or 4) the last of 1), 2), and/or 3). The next transmission and reception time with the UE may be 1) a next time when a PDCCH is transmitted to the UE (or a time when a next PDCCH is transmitted to the UE), 2) a next time when a PDSCH is transmitted to the UE (or a time when a next PDSCH is transmitted to the UE), and/or 3) the earlier between 1) and 2). For example, wide beam transmission or narrow beam transmission of the control channel and/or the data channel to the UE may depend on a time interval between the transmission time of a PDCCH that has scheduled latest data and the transmission time of a PDCCH that schedules next data. Or, wide beam transmission or narrow beam transmission of the control channel and/or the data channel to the UE may depend on a time interval between the transmission time of a latest UE-specific PDCCH and the transmission time of a next UE-specific PDCCH. Or, wide beam transmission or narrow beam transmission of the control channel and/or the data channel to the UE may depend on a time interval between the transmission/reception time of a latest PDSCH/PUSCH and the transmission/reception time of a next PDSCH/PUSCH.

Wide beam transmission or narrow beam transmission of the control channel and/or the data channel may depend on the mobility of the UE.

Wide beam transmission or narrow beam transmission of the control channel and/or the data channel may depend on a time from a last feedback of a suitable analog beam direction transmitted to the eNB by the UE. For example, if a time interval between a last time when the UE has transmitted a feedback of an analog beam direction and a next transmission/reception time is equal to or less than a specific time period T (T>0), the eNB may transmit the control channel and/or the data channel on a narrow beam. On the contrary, if the time interval between the last time when the UE has transmitted a feedback of an analog beam direction and the next transmission/reception time is larger than the specific time period T, the eNB may transmit the control channel and/or the data channel on a wide beam.

D. Multiple Beams for Control Channel and Single Beam for Data Channel

For successful data transmission, the reliability of a PDCCH should be ensured, first of all. To increase the transmission reliability, the PDCCH may be transmitted in a plurality of analog beam directions. Subsequently, when the UE receives the control channel and feeds back its suitable analog beam direction to the eNB, the eNB may transmit a PDSCH, using/referring to the analog beam direction fed back by the UE. For example, the eNB may transmit the PDSCH in the analog beam direction fed back by the UE, or in one of adjacent analog beam directions including the analog beam direction fed back by the UE. In the latter case, the eNB may transmit information about the beam direction used for the PDSCH transmission to the UE. To this end, the eNB may additionally transmit control information indicating the beam direction used for the PDSCH transmission, before the PDSCH transmission. The control information about the beam direction may include information (e.g., a beam direction index) indicating the beam direction used for the PDSCH transmission. Or, the adjacent analog beam directions including the analog beam direction fed back by the UE may be sequentially indexed, starting from 0, and the control information about the beam direction may indicate one of the newly indexed values. Herein, the analog beam direction fed back by the UE may be indexed as 0, and the number of the adjacent analog beam directions including the fed back analog beam direction may be pre-defined. Or, the UE may attempt to receive the PDSCH, using only its fed back analog beam direction, or may perform blind decoding on the adjacent analog beam directions including its fed back analog beam direction in order to receive the PDSCH. In the latter case, the UE may attempt a PDSCH detection operation (e.g., decoding) first on a signal in its fed back analog beam direction. That is, the control channel (e.g., PDCCH) may be transmitted in a plurality of analog beam directions, and the data channel (e.g., PDSCH or PUSCH) may be transmitted in a single analog beam direction. For feedback of an analog beam direction, section A may be referred to. For example, a feedback resource may be configured according to a beam direction that the UE determines to offer a good channel condition/reception performance. For example, if the eNB has transmitted a signal in beam direction 1 and beam direction 2, and the UE determines that beam direction 1 is better, the UE may feed back the beam direction in an A/N resource (or feedback resource) configured for beam direction 1. The A/N resource may be distinguished by at least one of a time resource (e.g., an OFDM symbol index, a slot index, a subframe index, etc.), a frequency resource (e.g., a PRB index), or a code resource (e.g., an OCC and a CS). The A/N resource may be identified by an A/N resource index, and the A/N resource index may correspond to a combination of [time resource, frequency resource, code resource] for A/N transmission (for details, refer to section A).

Meanwhile, a beam direction for a data channel may be indicated by a corresponding control channel (e.g., DCI). If different beam directions are adopted for the control channel and the data channel, the UE may assume that the data channel is not mapped to an OFDM symbol carrying the control channel. Accordingly, when the control channel and the data channel are transmitted in different beam directions, the UE may assume that the control channel and the data channel are always multiplexed in TDM. If the control channel and the data channel may be transmitted in one OFDM symbol, it may be assumed that the UE is capable of receiving both beams in this case. Or if the control channel and the data channel are transmitted in one OFDM symbol, it is assumed that the data channel is transmitted on the same beam as the control channel in this case. That is, in the case where the UE is capable of receiving one OFDM symbol only in one beam direction, if the control channel and the data channel are transmitted in the same OFDM symbol, the UE may assume that the beam direction of the data channel is based on a beam configured for the control channel.

Meanwhile, the control channel (e.g., PDCCH) and the data channel (e.g., PDSCH) may use the same subcarrier spacing (e.g., 30 kHz or 60 kHz) or different subcarrier spacings. In the latter case, since the control channel is transmitted in a plurality of OFDM symbol areas in a plurality of analog beam directions, the control channel may use a larger subcarrier spacing than that of the data channel, thereby reducing transmission latency. For example, the control channel may be transmitted with a subcarrier spacing such as 30 kHz or 60 kHz (i.e., a multiple of 15 kHz), whereas the data channel may be transmitted with a subcarrier spacing of 15 kHz.

Figure 14:
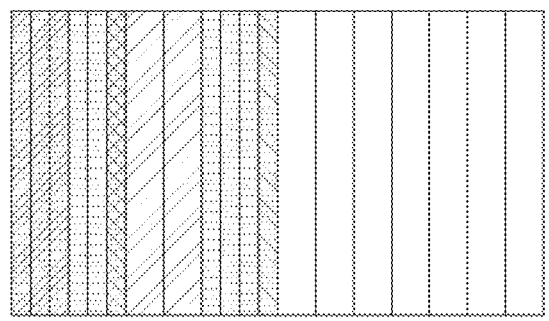

For example, if there are subcarrier spacings SC1 and SC2 and SC1 is larger than SC2 (e.g., SC1=30 kHz and SC2=15 kHz), a PDCCH may be transmitted with SC1 in a plurality of OFDM symbols in a plurality of analog beam directions. For example, the PDCCH may be transmitted in a different analog beam direction in each OFDM symbol. Upon receipt of the PDCCH, the UE may select the best of the analog beam directions in which the PDCCH has been transmitted, and feed back the selected analog beam direction to the eNB. For example, the feedback information may be transmitted on PUCCH A, and PUCCH A may be transmitted with the subcarrier spacing SC1, as illustrated in FIG. 14. For resources for PUCCH A, refer to section A. To allow the UE to determine and feed back the best analog beam direction, there may be a guard period between an OFDM symbol area for PDCCH reception and an OFDM symbol area for PUCCH A transmission. The guard period may also be defined based on the subcarrier spacing, SC1. Then, upon receipt of the feedback of the best analog beam direction of the UE, the eNB may transmit a PDSCH in a single analog beam direction, using/referring to the fed back analog beam direction. For example, the eNB may transmit a control channel and/or a data channel, using adjacent analog beam directions including the analog beam direction fed back by the UE. In this case, the PDSCH may be transmitted with the same subcarrier spacing as that of the PDCCH, SC1, or since the PDSCH is transmitted only in a single analog beam direction, the PDSCH may be transmitted, using the subcarrier spacing SC2, without unnecessarily using SC1. While not shown in FIG. 13, there may be a guard period between an OFDM symbol for PUCCH A transmission and an OFDM symbol for PDSCH transmission, and the guard period may also be defined based on the subcarrier spacing, SC1. Or the beam direction of the PDSCH may be identical to that of the PDCCH in an OFDM symbol carrying the PDCCH, whereas the beam direction of the PDSCH is a default beam direction in an OFDM symbol without the PDCCH. After a beam direction for the PDSCH is configured for the UE, the beam direction of the PDSCH may be changed to the configured beam direction. Subsequently, A/N feedback information for the PDSCH may be transmitted on PUCCH B, and PUCCH B may also be transmitted with the subcarrier spacing, SC1 to reduce latency. A resource for PUCCH B may be determined, using a resource used for the PDCCH transmission. For example, as illustrated in FIG. 9, the resource for PUCCH B may correspond to the index of a first CCE used for the PDCCH transmission. Specifically, it may be given that PUCCH B resource (index)=the index of the first CCE used for PDCCH transmission+offset.

Meanwhile, if a control channel and/or a data channel is transmitted in a single analog beam direction, the same signal may be transmitted repeatedly a plurality of times to transmit the channel during the same time period as for transmission in a plurality of analog beam directions. In this case, the repetition number may be given as the subcarrier spacing SC1 of the control channel/the subcarrier spacing SC2 of the data channel (e.g., if SC1=30 kHz and SC2=15 kHz, the repetition number is 2).

Additionally, although the UE may transmit the feedback of the best analog beam direction on PUCCH A after receiving the PDCCH, the UE may transmit feedback information about the best analog beam direction along with PUCCH B carrying A/N information for a PDSCH, when the PDSCH is scheduled, or along with a PUSCH when the PUSCH is scheduled.

Additionally, if a PDCCH is transmitted in a single analog beam direction, it may be assumed that the UE does not transmit a feedback of an analog beam direction and/or data is transmitted/received in a single analog beam direction. On the contrary, if the PDCCH is transmitted in a plurality of analog beam directions, it may be assumed that the UE transmits a feedback of an analog beam direction.

A situation may be considered, in which the UE has transmitted a feedback of a best analog beam direction later than a data transmission time, and thus the eNB has failed in receiving the feedback information at the data transmission time. To avert this problem, the eNB may transmit data on multiple beams before receiving the feedback information, and on a single beam after receiving the feedback of the beam direction. For example, for PDSCH transmission, the eNB may transmit a PDSCH on multiple beams before receiving a feedback of a best analog beam direction from the UE, and transmit the PDSCH repeatedly on a single beam after receiving the feedback from the UE. Herein, when the eNB receives the feedback from the UE, a time when the eNB repeatedly transmits the PDSCH on a single beam may be $(n+k)^{th}$ (e.g., k=4) subframe or OFDM symbol, wherein n is the index of a subframe or OFDM symbol carrying the feedback of the UE.

E. Switching Between Multi-Beam Transmission and Single-Beam Transmission

Whether to apply a single beam direction or multiple beam directions to a control channel and/or a data channel may depend on a change in the channel environment of a UE, the mobility of the UE, or the like. Further, whether to transmit a PDSCH on a single beam or multiple beams may depend on whether the UE is capable of feeding back a best analog beam direction. Accordingly, the present disclosure proposes a method of changing the number of analog beam directions in which control information and/or data is transmitted according to a situation. One or more of the following methods may be used alone or in combination.

Whether Single Analog Beam or Multiple Analog Beams are Used for PDCCH

Whether multiple analog beam directions (a single beam direction or multiple beam directions) are used for PDCCH transmission, or the number of analog beam directions used for the PDCCH transmission may be indicated in the following methods.

- It may be configured semi-statically by RRC signaling or the like.
- PDCCH transmission in a single beam direction or multiple beam directions may be indicated according to a scrambling sequence applied to a DM-RS for the PDCCH.
- PDCCH transmission in a single beam direction or multiple beam directions may depend on a time interval between a last transmission and reception time with the UE and a next transmission and reception time with the UE. For example, if the time interval between the last transmission and reception time with the UE and the next transmission and reception time with the UE is equal to or less than a specific time period T (T>0), the eNB may transmit the PDCCH in a single analog beam direction. On the contrary, if the time interval between the last transmission and reception time with the UE and the next transmission and reception time with the UE is larger than the specific time period T, the eNB may transmit the PDCCH in multiple analog beam directions. The last transmission and reception time with the UE may be 1) a last time when a PDCCH has been transmitted to the UE, 2) a last time when a PDSCH/PUSCH has been transmitted/received to/from the UE, 3) a last time when a PUCCH has been received from the UE, or 4) the last of 1), 2), and/or 3). The next transmission and reception time with the UE may be 1) a next time when a PDCCH is transmitted to the UE (or a time when a next PDCCH is transmitted to the UE), 2) a next time when a PDSCH is transmitted to the UE (or a time when a next PDSCH is transmitted to the UE), and/or 3) the earlier between 1) and 2). For the UE, for example, whether the PDCCH is transmitted in one or multiple beam directions may depend on a time interval between the transmission time of a PDCCH that has scheduled latest data and the transmission time of a PDCCH that schedules next data. Or for the UE, whether the PDCCH is transmitted in one or multiple beam directions may depend on a time interval between the transmission time of a latest UE-specific PDCCH and the transmission time of a next UE-specific PDCCH. Or for the UE, whether the PDCCH is transmitted in one or multiple beam directions may depend on a time interval between the transmission/reception time of a latest PDSCH/PUSCH and the transmission/reception time of a next PDSCH/PUSCH.

Whether the PDCCH is transmitted in one or multiple beam directions may depend on the mobility of the UE.

Whether the PDCCH is transmitted in one or multiple beam directions may depend on a time from a last feedback of a suitable analog beam direction transmitted to the eNB by the UE. For example, if a time interval between a last time when the UE has transmitted a feedback of an analog beam direction and a next transmission/reception time is equal to or less than a specific time period T (T>0), the eNB may transmit the PDCCH in a single beam direction. On the contrary, if the time interval between the last time when the UE has transmitted a feedback of an analog beam direction and the next transmission/reception time is larger than the specific time period T, the eNB may transmit the PDCCH in multiple beam directions.

Whether UE is to Feed Back Analog Beam Direction

As described in section C, the UE may transmit a feedback of its best analog beam direction after receiving a PDCCH. Whether to transmit the feedback may be determined in the following manners.

It may be configured semi-statically by RRC signaling or the like.

It may be indicated by a PDCCH (i.e., DCI).

If the PDCCH has been detected in a single analog beam, the UE may not feed back the best analog beam direction, whereas if the PDCCH has been detected in multiple analog beam directions, the UE may feed back the best analog beam direction.

Whether the UE is to transmit the feedback of the best analog beam direction may be determined according to the value of an RNTI (e.g., C-RNTI) by which the CRC of the PDCCH is scrambled and/or the scrambling sequence (e.g., a C-RNTI determining the scrambling sequence) of a PDCCH DM-RS.

Whether the UE is to transmit the feedback of the best analog beam direction may depend on a time interval between a last transmission and reception time with the eNB and a next transmission and reception time with the eNB. For example, if the time interval between the last transmission and reception time with the eNB and the next transmission and reception time with the eNB is equal to or less than a specific time period T (T>0), the UE may not transmit the feedback of the best analog beam direction. On the contrary, if the time interval between the last transmission and reception time with the eNB and the next transmission and reception time with the eNB is larger than the specific time period T, the UE may transmit the feedback of the best analog beam direction. The last transmission and reception time with the eNB may be 1) a last time when a PDCCH has been received from the eNB, 2) a last time when a PDSCH/PUSCH has been received/transmitted from/to the eNB, 3) a last time when a PUCCH has been transmitted to the eNB, or 4) the last of 1), 2), and/or 3). The next transmission and reception time with the eNB may be 1) a next time when a PDCCH is received from the eNB (or a time when a next PDCCH is received from the eNB), 2) a next time when a PDSCH is received from the eNB (or a time when a next PDSCH is received from the eNB), and/or 3) the earlier between 1) and 2). For example, whether the UE is to transmit the feedback of the best analog beam direction may depend on a time interval between the reception time of a PDCCH that has scheduled latest data and the reception time of a PDCCH that schedules next data. Or whether the UE is to transmit the feedback of the best analog beam direction may depend on a time interval between the reception time of a latest UE-specific PDCCH and the reception time of a next UE-specific PDCCH. Or whether the UE is to transmit the feedback of the best analog beam direction may depend on a time interval between the reception/transmission time of a latest PDSCH/PUSCH and the reception/transmission time of a next PDSCH/PUSCH.

Whether the UE is to transmit the feedback of the best analog beam direction may depend on the mobility of the UE.

Whether the UE is to transmit the feedback of the best analog beam direction may depend on a time from a last feedback of a suitable analog beam direction transmitted to the eNB by the UE. For example, if a time interval between a last time when the UE has transmitted a feedback of an analog beam direction and a next transmission/reception time is equal to or less than a specific time period T (T>0), the UE may not transmit the feedback of the best analog beam direction. On the contrary, if the time interval between the last time when the UE has transmitted a feedback of an analog beam direction and the next transmission/reception time is larger than the specific time period T, the UE may transmit the feedback of the best analog beam direction.

Whether Single Analog Beam or Multiple Analog Beams are Used for PDSCH/PUSCH

Whether multiple analog beam directions (a single beam direction or multiple beam directions) are used for transmission/reception of a data channel (e.g., PDSCH/PUSCH) scheduled by a PDCCH, or the number of analog beam directions in which the data channel is transmitted may be indicated in the following methods.

It may be configured semi-statically by RRC signaling or the like.

It may be indicated by a PDCCH (i.e., DCI).

If the PDCCH is transmitted on a single analog beam, the data channel may also be transmitted in a single analog beam direction, whereas if the PDCCH is transmitted in multiple analog beam directions, the data channel may also be transmitted in multiple analog beam directions.

Whether the data channel is transmitted in multiple analog beam directions (or in one or more analog beam directions) may be determined according to the value of an RNTI (e.g., C-RNTI) by which the CRC of the PDCCH is scrambled and/or the scrambling sequence (e.g., a C-RNTI determining the scrambling sequence) of a PDCCH DM-RS.

If the UE transmits a feedback of a best analog beam direction after receiving the PDCCH, the eNB may transmit the data channel in a single analog beam direction (see section D). On the other hand, if the UE does not transmit the feedback of the best analog beam direction after receiving the PDCCH, the eNB may transmit the data channel in multiple analog beam directions.

Whether the data channel is transmitted in multiple analog beam directions may depend on a time interval between a last transmission and reception time with the UE and a next transmission and reception time with the UE. For example, if the time interval between the last transmission and reception time with the UE and the next transmission and reception time with the UE is equal to or less than a specific time period T (T>0), the eNB may transmit the data channel in a single analog beam direction. On the contrary, if the time interval between the last transmission and reception time with the UE and the next transmission and reception time with the UE is larger than the specific time period T, the eNB may transmit the data channel in multiple analog beam directions. The last transmission and reception time with the UE may be 1) a last time when a PDCCH has been transmitted to the UE, 2) a last time when a PDSCH/PUSCH has been transmitted/received to/from the UE, 3) a last time when a PUCCH has been received from the UE, or 4) the last of 1), 2), and/or 3). The next transmission and reception time with the UE may be 1) a next time when a PDCCH is transmitted to the UE (or a time when a next PDCCH is transmitted to the UE), 2) a next time when a PDSCH is transmitted to the UE (or a time when a next PDSCH is transmitted to the UE), and/or 3) the earlier between 1) and 2). For example, for the UE, whether the data channel is transmitted in multiple analog beam directions may depend on a time interval between the transmission time of a PDCCH that has scheduled latest data and the transmission time of a PDCCH that schedules next data. Or for the UE, whether the data channel is transmitted in multiple analog beam directions may depend on a time interval between the transmission time of a latest UE-specific PDCCH and the transmission time of a next UE-specific PDCCH. Or for the UE, whether the data channel is transmitted in multiple analog beam directions may depend on a time interval between the transmission time of a latest PDSCH/PUSCH and the transmission time of a next PDSCH/PUSCH.

Whether the data channel is transmitted in multiple analog beam directions may be depend on the mobility of the UE.

Whether the data channel is transmitted in multiple analog beam directions may depend on a time from a last feedback of a suitable analog beam direction transmitted to the eNB by the UE. For example, if a time interval between a last time when the UE has transmitted a feedback of an analog beam direction and a next transmission/reception time is equal to or less than a specific time period T (T>0), the eNB may transmit the data channel in a single beam direction. On the contrary, if the time interval between the last time when the UE has transmitted a feedback of an analog beam direction and the next transmission/reception time is larger than the specific time period T, the eNB may transmit the data channel in multiple beam directions.

F. Random Analog Beam Direction

If it is difficult to determine a best analog beam direction for the UE due to a change in the channel environment of the UE or the mobility of the UE, an analog beam direction may be changed randomly. Thus, signal transmission only in an analog beam direction unsuitable for the UE may be prevented, and a diversity effect may be achieved. For random beamforming, the following methods may be considered.

An analog beam direction may be changed randomly or sequentially on a PRB or PRB group basis in the frequency domain. For example, a control channel and/or a data channel is transmitted by space frequency block coding (SFBC), and an antenna port through which the control channel and/or the data channel and an RS for demodulating the control channel and/or the data channel are transmitted may be changed on a PRB or PRB group basis. For example, given antenna ports 0, 1, 2, and 3, the control channel and/or the data channel, and the RS are transmitted through antenna ports 0 and 1 in odd-numbered PRBs/PRB groups, whereas the control channel and/or the data channel, and the RS are transmitted through antenna ports 2 and 3 in even-numbered PRBs/PRB groups. Therefore, the control channel and/or the data channel may be transmitted in different analog beam directions in the odd-numbered and even-numbered PRBs/PRB groups.

A unit for changing an analog beam direction on the frequency axis may be equal to a half system bandwidth. In this case, if antenna ports 0, 1, 2, and 3 are given, the control channel and/or the data channel, and the RS may be transmitted through antenna ports 0 and 1 in one half frequency area, whereas the control channel and/or the data channel, and the RS may be transmitted through antenna ports 2 and 3 in the other half frequency area. Accordingly, the control channel and/or the data channel may be transmitted in different analog beam directions at the half-system bandwidth level.

An analog beam direction may be changed randomly or sequentially on an OFDM symbol or OFDM symbol group basis.

When the eNB transmits a signal, the eNB may transmit the signal on a narrow beam by random beamforming or on a single beam. Despite coverage extension, the use of single beamforming may result in failed signal transmission if the UE does not have accurate knowledge of a beam direction. On the other hand, signal transmission by random beamforming may decrease a beamforming performance gain, but may be useful when the location of the UE is not clear or the mobility of the UE is high. A different transmission scheme may be feasible according to the coverage of the UE, a channel environment, and the importance of data latency. The present disclosure proposes a transmission scheme of selectively using single beam transmission and random beamforming transmission.

When a control channel and/or a data channel, and a related RS are transmitted, the transmission may be performed on a single beam or by random beamforming. How the transmission is performed may be indicated in the following methods.

It may be configured semi-statically by RRC signaling.

Single beam transmission or random beamforming transmission of the control channel and/or the data channel may be indicated according to a scrambling sequence applied to a DM-RS of the control channel and/or the data channel.

Single beam transmission or random beamforming transmission of the control channel and/or the data channel may depend on a time interval between the last transmission and reception time with the UE and a next transmission and reception time with the UE. For example, if the time interval between the last transmission and reception time with the UE and the next transmission and reception time with the UE is equal to or less than a specific time period T (T>0), the control channel and/or the data channel may be transmitted on a single beam. On the contrary, if the time interval between the last transmission and reception time with the UE and the next transmission and reception time with the UE is larger than the specific time period T, the control channel and/or the data channel may be transmitted by random beamforming. The last transmission and reception time with the UE may be 1) a last time when a PDCCH has been transmitted to the UE, 2) a last time when a PDSCH/PUSCH has been transmitted/received to/from the UE, 3) a last time when a PUCCH has been received from the UE, or 4) the last of 1), 2), and/or 3). The next transmission and reception time with the UE may be 1) a next time when a PDCCH is transmitted to the UE (or a time when a next PDCCH is transmitted to the UE), 2) a next time when a PDSCH is transmitted to the UE (or a time when a next PDSCH is transmitted to the UE), and/or 3) the earlier between 1) and 2). For example, single beam transmission or random beamforming transmission of the control channel and/or the data channel may depend on a time interval between the transmission time of a PDCCH that has scheduled latest data and the transmission time of a PDCCH that schedules next data. Or single beam transmission or random beamforming transmission of the control channel and/or the data channel may depend on a time interval between the transmission time of a latest UE-specific PDCCH and the transmission time of a next UE-specific PDCCH. Or single beam transmission or random beamforming transmission of the control channel and/or the data channel may depend on a time interval between the transmission time of a latest PDSCH/PUSCH and the transmission time of a next PDSCH/PUSCH.

Single beam transmission or random beamforming transmission of the control channel and/or the data channel may depend on the mobility of the UE.

Single beam transmission or random beamforming transmission of the control channel and/or the data channel may depend on a time from a last feedback of a suitable analog beam direction transmitted to the eNB by the UE. For example, if a time interval between a last time when the UE has transmitted a feedback of an analog beam direction and a next transmission/reception time is equal to or less than a specific time period T (T>0), the eNB may transmit the control channel and/or the data channel on a single beam. On the contrary, if the time interval between the last time when the UE has transmitted a feedback of an analog beam direction and the next transmission/reception time is larger than the specific time period T, the eNB may transmit the control channel and/or the data channel by random beamforming.

G. Data Transmission on PDCCH

For URLLC data to which latency is important, if the transmission size of data is small, it may be more efficient to transmit the data on a PDCCH than on a PDSCH. Further, considering that a control channel (e.g., PDCCH) is transmitted in consideration of a case in which an accurate beam direction of a UE is not known, as in transmission in multiple beam directions, transmission in a wide beam direction, and random beamforming transmission, and data (e.g., a PDSCH) is transmitted in a single beam direction by determining a beam direction of the UE, it may be better to transmit the data on the PDCCH, when the accurate transmission beam direction of the UE is not known. In this regard, the eNB may transmit data on the PDCCH or the PDSCH according to a situation. When the data is transmitted on the PDCCH, the PDSCH may not be transmitted additionally, whereas if the data is transmitted on the PDSCH, the PDSCH may be transmitted after the PDCCH is transmitted.

To indicate whether data is transmitted on a PDCCH (the PDCCH is transmitted for the purpose of direct data transmission) or on a PDSCH (the PDSCH is transmitted for the purpose of data scheduling), the following methods may be used.

Whether the data is transmitted on the PDCCH or the PDSCH may be indicated by identifying an RNTI (e.g., a C-RNTI) by which the CRC of the PDCCH is scrambled.

A bit(s) indicating whether the data is transmitted on the PDCCH or the PDSCH may be transmitted on a PDCCH (DCI).

When a corresponding method is used, the size (e.g., transport block size (TBS)) of data may be configured based on (to be) a DCI size sharing blind decoding (BD). For example, a TBS used for data transmission may be determined according to a transmission mode (TM) configured for the UE, a combination of a plurality of DCI fields, and a bandwidth. When the data is transmitted on the PDCCH, the size of the data is limited to a set of specific value(s) based on the DCI size (e.g., the payload size of the PDCCH is determined by a function of the DCI size) (e.g., data size=N*DCI size where N is a positive integer), thereby minimizing the increase of the number of BDs during PDCCH detection. Specifically, the UE performs BD on the assumption that the PDCCH payload size is (i) DCI size, or (ii) DCI size+data size, and the data size is limited to a specific value based on the DCI size. Therefore, the increase of the number of BDs may be minimized.

Figure 15:
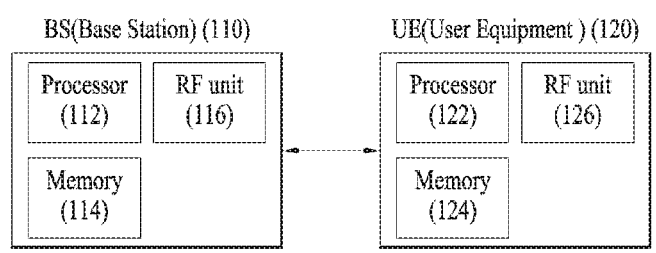
FIG. 15 illustrates a base station and a user equipment applicable to an embodiment of the present disclosure.

FIG. 15 illustrates a BS and a UE of a wireless communication system, which are applicable to embodiments of the present disclosure.

Referring to FIG. 15, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, eNBs or other apparatuses of a wireless mobile communication system.

The invention claimed is:

1. A method of receiving a signal by a user equipment (UE) in a wireless communication system, the method comprising:
receiving a same control channel in a plurality of different analog beam directions;
transmitting feedback information about one analog beam direction selected from among the plurality of different analog beam directions in which the control channel has been received; and
receiving a data channel corresponding to the control channel only in one analog beam direction related to the feedback information among the plurality of different analog beam directions,
wherein the feedback information is transmitted in control channel resources determined based on the selected analog beam direction, and the control channel resources comprise a different time resource for each analog beam direction.

2. The method of claim 1, wherein a signal of the control channel has a first subcarrier spacing (SC), a signal of the data channel has a second SC, and the second SC is smaller than the first SC.

3. The method of claim 2, wherein the second SC is a multiple of the first SC.

4. The method of claim 1, wherein a signal of the control channel and a signal of the data channel have a same subcarrier spacing (SC), and the control channel is received only once in each of the plurality of different analog beam directions, and the data channel is received repeatedly a plurality of times in a same analog beam direction.

5. The method of claim 1, wherein each analog beam direction of the plurality of different analog beam directions corresponds to a different orthogonal frequency division multiplexing (OFDM) symbol.

6. The method of claim 1, wherein the control channel comprises a physical downlink control channel (PDCCH), and the data channel comprises a physical downlink shared channel (PDSCH).

7. A user equipment (UE) in a wireless communication system, the UE comprising:
a radio frequency (RF) module; and
a processor,
wherein the processor is configured to:
receive a same control channel in a plurality of different analog beam directions,
transmit feedback information about one analog beam direction selected from among the plurality of different analog beam directions in which the control channel has been received, and
receive a data channel corresponding to the control channel only in one analog beam direction related to the feedback information among the plurality of different analog beam directions,
wherein the feedback information is transmitted in control channel resources determined based on the selected analog beam direction, and the control channel resources comprise a different time resource for each analog beam direction.

8. The UE of claim 7, wherein a signal of the control channel has a first subcarrier spacing (SC), a signal of the data channel has a second SC, and the second SC is smaller than the first SC.

9. The UE of claim 8, wherein the second SC is a multiple of the first SC.

10. The UE of claim 7, wherein a signal of the control channel and a signal of the data channel have a same subcarrier spacing (SC), and the control channel is received only once in each of the plurality of different analog beam directions, and the data channel is received repeatedly a plurality of times in a same analog beam direction.

11. The UE of claim 7, wherein each analog beam direction of the plurality of different analog beam directions corresponds to a different orthogonal frequency division multiplexing (OFDM) symbol.

12. The UE of claim 7, wherein the control channel comprises a physical downlink control channel (PDCCH), and the data channel comprises a physical downlink shared channel (PDSCH).

* * * * *